(12) United States Patent
 Sette

(10) Patent No.: US 12,475,349 B2
(45) Date of Patent: Nov. 18, 2025

(54) RADIOFREQUENCY TRANSCEIVER DEVICE AND METHOD FOR MANUFACTURING SAME

(71) Applicant: PRIMO1D, Grenoble (FR)

(72) Inventor: Daniele Sette, Grenoble (FR)

(73) Assignee: PRIMO1D, Grenoble (FR)

( * ) Notice: Subject to any disclaimer, the term of this patent is extended or adjusted under 35 U.S.C. 154(b) by 239 days.

(21) Appl. No.: 18/263,788

(22) PCT Filed: Feb. 3, 2022

(86) PCT No.: PCT/FR2022/050216
§ 371 (c)(1),
(2) Date: Aug. 1, 2023

(87) PCT Pub. No.: WO2022/171951
PCT Pub. Date: Aug. 18, 2022

(65) Prior Publication Data
US 2024/0104331 A1    Mar. 28, 2024

(30) Foreign Application Priority Data
Feb. 15, 2021   (FR) ...................................... 2101414

(51) Int. Cl.
*G06K 19/077*    (2006.01)
*H01Q 1/08*    (2006.01)
(Continued)

(52) U.S. Cl.
CPC ... *G06K 19/0775* (2013.01); *G06K 19/07788* (2013.01); *H01Q 1/085* (2013.01);
(Continued)

(58) Field of Classification Search
CPC ............. G06K 19/077; G06K 19/0775; G06K 19/07788; H01Q 1/08; H01Q 1/085;
(Continued)

(56) References Cited

U.S. PATENT DOCUMENTS 8,471,773 B2 *   6/2013   Vicard ............. G06K 19/07754
                                                                343/702
9,953,953 B2 *   4/2018   Brun ....................... H01L 24/06
(Continued)

FOREIGN PATENT DOCUMENTS

CN        107122815 A     9/2017
CN        110184706 A     8/2019
(Continued)

OTHER PUBLICATIONS

Hardy et al., Automated Insertion of Package Dies onto Wire and into Textile Yarn Sheath, Microsystem Technologies, Feb. 19, 2019, https://doi.org/10.1007/s00542-019-04361-y, 13 pages.
(Continued)

*Primary Examiner* — Hai V Nguyen
(74) *Attorney, Agent, or Firm* — TraskBritt

(57) ABSTRACT

A radiofrequency transceiver device comprises an electronic circuit including a chip and a first antenna electrically connected to the chip, a textile-core thread formed of a non-conductive material, and a second antenna formed of a textile element in an electrically conducting material and disposed in non-contiguous turns around and along the textile-core thread. The electronic circuit is disposed relative to the second antenna so as to allow the electromagnetic coupling of the first and second antenna. A label may comprise the radiofrequency transceiver device. A particular method may be used to manufacture such a device.

20 Claims, 3 Drawing Sheets

(51) Int. Cl.
*H01Q 1/27* (2006.01)
*H01Q 9/16* (2006.01)
*H04B 1/40* (2015.01)

(52) U.S. Cl.
CPC .............. *H01Q 1/273* (2013.01); *H01Q 9/16* (2013.01); *H04B 1/40* (2013.01)

(58) Field of Classification Search
CPC . H01Q 1/27; H01Q 1/273; H01Q 9/16; H04B 1/40
See application file for complete search history.

(56) References Cited

U.S. PATENT DOCUMENTS

| | | | |
|---|---|---|---|
| 10,301,751 B2 * | 5/2019 | Dias | D02G 3/22 |
| 10,458,048 B2 * | 10/2019 | Dias | H05K 1/189 |
| 10,515,298 B2 * | 12/2019 | Scattergood | G06K 19/07767 |
| 10,772,197 B2 * | 9/2020 | Holbery | H05K 1/189 |
| 10,908,732 B1 * | 2/2021 | Sundara-Rajan | G06F 3/0445 |
| 10,974,553 B2 * | 4/2021 | Destraves | B60C 19/002 |
| 11,018,406 B2 * | 5/2021 | Destraves | B29D 30/0601 |
| 11,081,466 B2 * | 8/2021 | Rolland | H01L 24/85 |
| 11,152,684 B2 * | 10/2021 | Destraves | H01Q 1/38 |
| 11,152,685 B2 * | 10/2021 | Destraves | H01Q 1/2241 |
| 11,209,799 B2 * | 12/2021 | Arene | G06K 19/027 |
| 11,210,834 B1 * | 12/2021 | Chamdani | G06T 13/40 |
| 11,233,012 B2 * | 1/2022 | Keating | H01L 23/5389 |
| 11,502,411 B2 * | 11/2022 | Andia Vera | H04B 5/24 |
| 11,505,011 B2 * | 11/2022 | Lallement | G06K 19/07764 |
| 11,548,331 B2 * | 1/2023 | Destraves | B60C 23/0452 |
| 11,618,288 B2 * | 4/2023 | Noel | G06K 19/07764 152/450 |
| 11,822,309 B2 * | 11/2023 | Arene | H01L 24/85 |
| 11,981,166 B2 * | 5/2024 | Destraves | B60C 23/0452 |
| 12,005,748 B2 * | 6/2024 | Destraves | B60C 15/0018 |
| 12,147,857 B2 * | 11/2024 | Hagihara | D03D 15/25 |
| 12,175,849 B2 * | 12/2024 | Claeys | G08B 13/2402 |
| 12,223,814 B2 * | 2/2025 | Chandramowle | G08B 13/2417 |
| 12,296,624 B2 * | 5/2025 | Destraves | B60C 9/04 |
| 12,327,153 B2 * | 6/2025 | Carteaux | D02G 3/441 |
| 2003/0214399 A1 | 11/2003 | Naruse et al. | |
| 2019/0391560 A1 * | 12/2019 | Arene | G06K 19/027 |
| 2020/0079159 A1 * | 3/2020 | Destraves | B29D 30/0061 |
| 2020/0117965 A1 * | 4/2020 | Drossaert | G06K 19/027 |
| 2021/0110950 A1 * | 4/2021 | Rousselet | H01B 9/003 |

FOREIGN PATENT DOCUMENTS

| | | | | |
|---|---|---|---|---|
| EP | 2897084 A1 * | 7/2015 | | D03D 15/00 |
| EP | 3191632 B1 * | 12/2018 | | D02G 3/38 |
| EP | 3923195 A1 * | 12/2021 | | G06K 19/027 |
| EP | 4069525 B1 * | 2/2024 | | B60C 19/00 |
| EP | 4069526 B1 * | 2/2024 | | B60C 9/04 |
| EP | 4421680 A1 * | 8/2024 | | H01Q 1/364 |
| EP | 4425374 A1 * | 9/2024 | | G06K 19/07764 |
| FR | 2002785 A1 | 10/1969 | | |
| FR | 3036823 A1 | 12/2016 | | |
| FR | 3059607 A1 | 6/2018 | | |
| FR | 3078980 A1 | 9/2019 | | |
| GB | 2472025 A | 1/2011 | | |
| GB | 2472026 A | 1/2011 | | |
| JP | 2004-192114 A | 7/2004 | | |
| JP | 2013-092972 A | 5/2013 | | |
| JP | 2013-189718 A | 9/2013 | | |
| WO | 2008/080245 A2 | 7/2008 | | |
| WO | 2011/161336 A1 | 12/2011 | | |
| WO | 2016/038342 A1 | 3/2016 | | |
| WO | 2018/189013 A1 | 10/2018 | | |
| WO | 2019/151475 A1 | 8/2019 | | |
| WO | WO-2024010551 A1 * | 1/2024 | | H01Q 1/2241 |
| WO | WO-2024177600 A1 * | 8/2024 | | H01Q 1/2241 |

OTHER PUBLICATIONS

International Search Report for International Application No. PCT/FR2022/050216 dated Jun. 2, 2022, 2 pages.
International Written Opinion for International Application No. PCT/FR2022/050216 dated Jun. 2, 2022, 6 pages.
Japanese Office Action for Application No. 023-548882 dated Jan. 29, 2025, 6 pages with English translation.
Japanese Search Report for Application No. 023-548882 dated Dec. 11, 2024, 7 pages.

* cited by examiner

RADIOFREQUENCY TRANSCEIVER DEVICE AND METHOD FOR MANUFACTURING SAME

CROSS-REFERENCE TO RELATED APPLICATIONS

This application is a national phase entry under 35 U.S.C. § 371 of International Patent Application PCT/FR2022/050216, filed Feb. 3, 2022, designating the United States of America and published as International Patent Publication WO 2022/171951 A1 on Aug. 18, 2022, which claims the benefit under Article 8 of the Patent Cooperation Treaty to French Patent Application Serial No. FR2101414, filed Feb. 15, 2021.

TECHNICAL FIELD

The present disclosure relates to a radio frequency transceiver device, such as an RFID tag. More particularly, the present disclosure relates to a flexible radio frequency transceiver device that is robust and capable of deforming elastically. Such a device finds applications in the field of tagging objects and, more particularly, objects that are liable to deform, as is the case, for example, in the field of textiles.

BACKGROUND

Documents U.S. Pat. No. 8,471,773, WO2016038342, WO2011161336, GB2472025, GB2472026, JP2013189718 or WO2008080245 disclose a device incorporating a semiconductor chip in a thread of a textile nature, thus allowing a wire form factor to be conferred on this device. In document US2019391560, two antenna wires formed of electrical conductors are respectively soldered to the pads of a radio frequency (RF) transmission-reception chip in accordance with the implementation of the "E-Thread™" technology.

This soldering may be carried out in grooves provided on lateral and opposite faces of the chip. Conventionally, the antenna wire consists of a strand of electrically conductive material (or of a plurality of such strands), and it has a substantially circular section whose diameter is typically between 50 and 200 microns, which allows it to be inserted into a groove formed on one side of the chip, the height of this chip typically being between 300 and 500 microns.

Regardless of how the electrical connection between the pads of the transmission-reception chip and the antenna wire is made, this connection remains relatively fragile. This is particularly the case with respect to the tensile, torsion, or shearing forces that may be applied to the antenna wires when the transmission-reception device is integrated into an object, or during its integration into this object.

Document FR3059607 discloses a radio frequency communication module for a tire. This module is embedded in a rubber mixture and comprises a so-called "radiating" antenna having the shape of a coil spring, this spring consisting of a plastically deformed rigid steel wire. The length of the spring is chosen to correspond to the half-wavelength of the transmission signal of the radio frequency communication module in its environment, the rubber mass in the case of the disclosure of this document. The module also comprises an electronic circuit, encapsulated in a rigid mass and comprising, arranged on a PCB support, a semiconductor chip electrically connected to a so-called "primary" antenna formed by a micro-coil and the impedance of which is adapted to the impedance of the semiconductor chip. This chip implements the radio frequency transceiver functions of the module, and it may, in particular, be an RFID (Radio Frequency Identification) chip making it possible to store and to communicate a unique identification number of the module. The electronic circuit is arranged in or against the radiating antenna to allow the electromagnetic coupling of the radiating antenna and the primary antenna.

However, the radio frequency communication module is particularly rigid and can never be integrated into a textile object such as clothing. This is, in particular, due to the very nature of the radiating antenna, formed from a plastically deformed steel wire, and therefore excessively rigid for this application.

BRIEF SUMMARY

The object of the present disclosure is to address the above-mentioned problems, at least in part. More particularly, an object of the present disclosure is to propose a flexible radio frequency transceiver device, that is, capable of deforming, in particular, under bending or shearing forces that it may undergo, in order to be able to integrate into a textile part such as clothing. Another aim of the disclosure is to propose a robust radio frequency transceiver device not subject to problems of fragility of the electrical connections between the antenna and the chip that have been disclosed above. Another object of the present disclosure is to provide a method for the volume industrial manufacture of a flexible transceiver device.

With a view to achieving this object, the subject matter of the present disclosure describes a radio frequency transceiver device comprising:
  an electronic circuit comprising a chip and a first antenna electrically connected to the chip;
  a textile-core thread formed of a non-conductive material;
  a second antenna formed of a textile element made of an electrically conducting material and disposed in non-contiguous turns around and along the textile-core thread.

According to the disclosure, the electronic circuit is disposed relative to the second antenna so as to allow the electromagnetic coupling of the first and second antenna.

The essentially textile nature of the radio frequency transceiver device ensures its flexible character, which makes it possible to consider its integration into deformable objects.

The transceiver device can be incorporated into an electronic tag to facilitate this integration.

According to other advantageous non-limiting features of the present disclosure, taken alone or according to any technically feasible combination:
  the first antenna has a first axis, the second antenna has a second axis, the first axis and the second axis being parallel to one another;
  the electronic circuit is attached to the textile-core thread;
  the radio frequency transceiver device comprises a layer of adhesive between the electronic circuit and the textile-core thread;
  the electronic circuit is held assembled to the textile-core thread by a first textile covering thread or by the conductive textile element wound in turns on the textile-core thread and on the electronic circuit;
  the conductive textile element is integrated into a textile sheath, the electronic circuit and the textile-core thread being arranged inside the textile sheath;
  the textile sheath is a fabric, a knit or a braid;

the conductive textile element is wound directly onto the textile-core thread, the electronic circuit being assembled to an exterior surface of at least one turn;

the textile element is a tape or thread;

the conductive textile element has a diameter or a thickness of less than 100 microns;

the radio frequency transceiver device comprises a coating layer encapsulating the electronic circuit, the textile-core thread and the textile element;

the radio frequency transceiver device comprises a second covering thread wound in turns around the textile-core thread, the electronic circuit and the conductive textile element.

According to another aspect, embodiments of the present disclosure include a method for manufacturing a transceiver device, the method comprising:

a step of assembling a plurality of electronic circuits on a textile-core thread, so as to space them apart along the textile-core thread, the electronic circuits each comprising a chip and a first antenna electrically connected to the chip; and a step of preparing a second antenna formed from a textile element made of an electrically conductive material and arranged in non-contiguous turns around the textile-core thread.

According to other advantageous non-limiting features of the present disclosure, taken alone or according to any technically feasible combination:

the assembling step comprises applying an adhesive to hold the plurality of electronic circuits directly on the textile-core thread;

the assembling step comprises winding a first textile covering thread in turns on the textile-core thread and on the electronic circuits;

the assembly step and the preparation step are carried out simultaneously by winding the textile element directly onto the textile-core thread and onto the electronic circuit;

the preparation step comprises integrating the textile element in non-contiguous turns in a textile sheath of the textile-core;

the textile element is integrated by weaving, by knitting or by braiding the textile sheath around the textile-core thread from elementary textile threads, the conductive textile element constituting one of the elementary threads;

the preparation step comprises winding the conductive textile element directly onto the textile-core thread, and the assembly step, carried out after the preparation step, comprises assembling each electronic circuit to an exterior surface of at least one turn of the conductive textile element;

the conductive textile element is a tape or thread;

the manufacturing method further comprises a covering step during which a second covering thread is wound in turns around the textile-core thread and the conductive textile element.

BRIEF DESCRIPTION OF THE DRAWINGS

Other features and advantages of the present disclosure will emerge from the following detailed description of example embodiments of the disclosure with reference to the accompanying figures, in which.

DETAILED DESCRIPTION

Figure 1A:
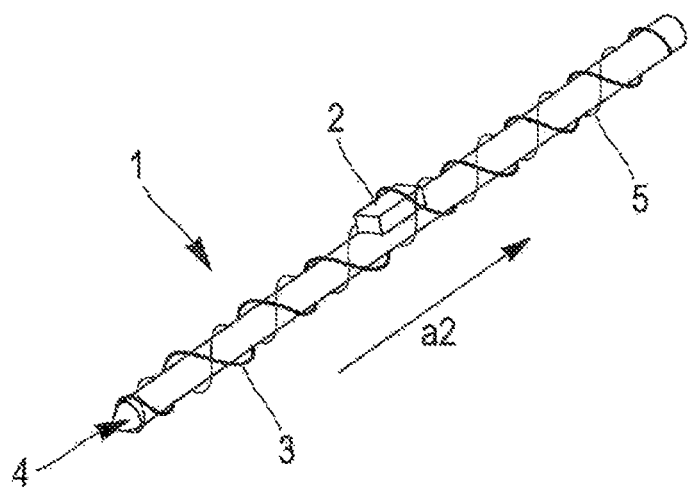
FIGS. 1A and 1B show a transceiver device according to a first embodiment.
Figure 1B:
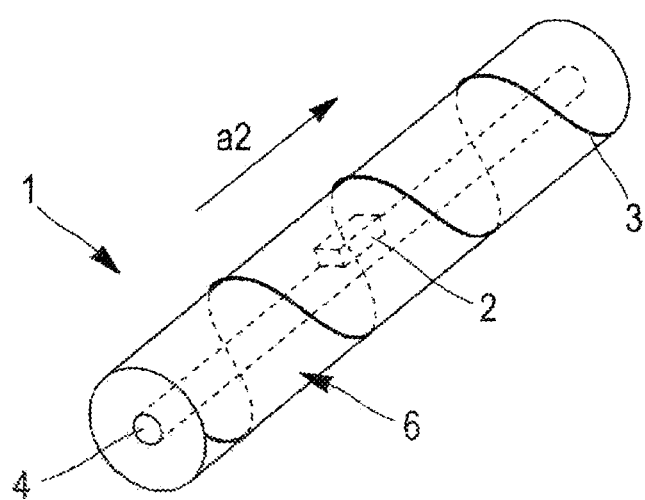
Figure 2:
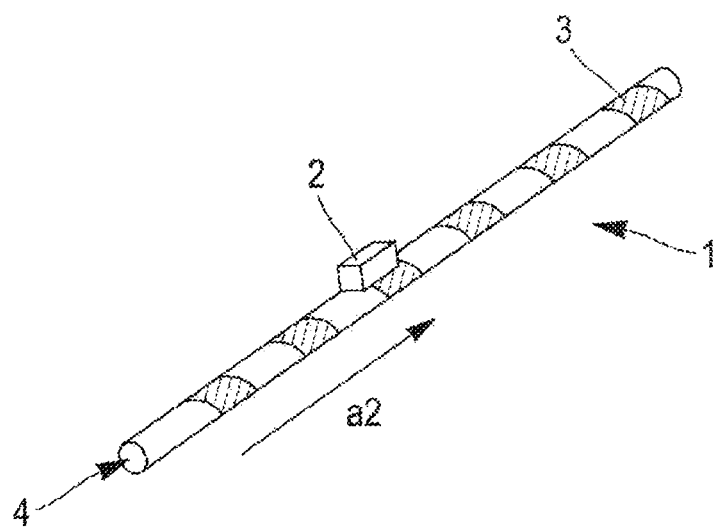
FIG. 2 shows a transceiver device according to a second embodiment.
Figure 3:
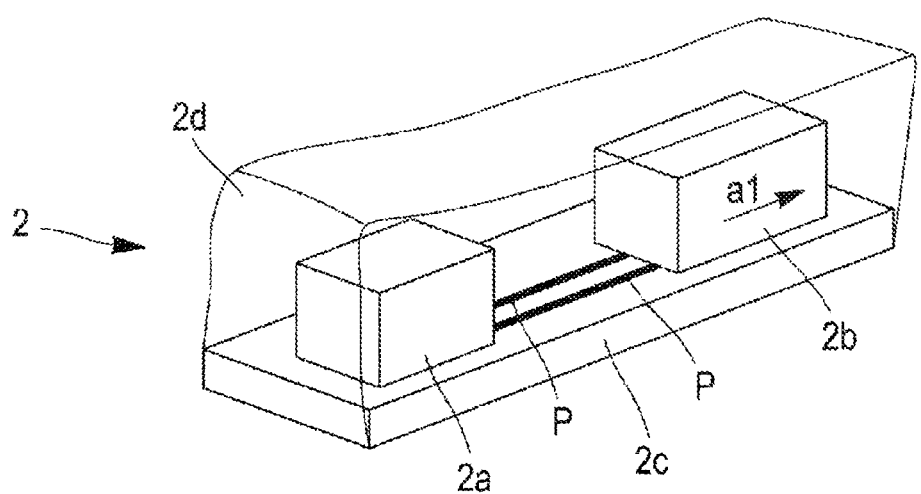
FIG. 3 shows an electronic circuit of a transceiver device according to the disclosure.
Figure 4:
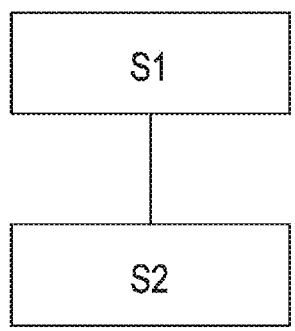
FIG. 4 schematically shows the general principles of a method according to the disclosure.
Figure 5:
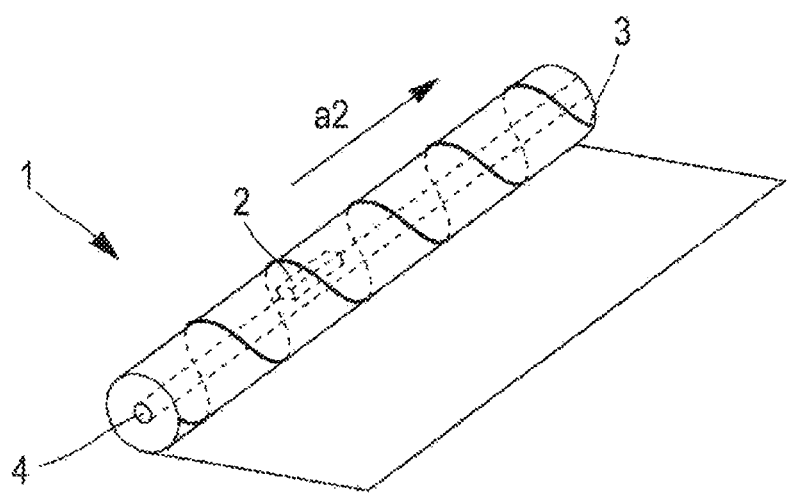
FIG. 5 schematically shows an electronic tag integrating a transceiver device according to the disclosure.

In a very general way, and with reference to FIGS. 1A, 1B and 2 representing several embodiments, a radio frequency transceiver device 1 according to an embodiment of the present description comprises an electronic circuit 2 comprising a transceiver chip 2a and a first antenna 2b electrically connected to this chip 2a. It may involve an RFID identification chip 2a, able to hold an identifier and transmit this identifier on request from a remote interrogator. Preferentially, the first antenna is a near-field magnetic antenna. It may be formed from a coil, or more generally a magnetic loop consisting of one or more turns. It may take the form of an integrated electronic component 2b as shown in FIG. 3. The first antenna has a first antenna axis a1, for example, an axis oriented along the direction of the magnetic field generated or induced by the magnetic loop.

The chip 2a and the first antenna 2b can be arranged on a substrate 2c having electrical connection tracks P, thus making it possible to electrically (galvanically) connect these two elements, in particular, when the first antenna 2b is in the form of an integrated electronic component. The support or substrate 2c may be flexible or rigid. It is also possible to connect these two components by wire bonding. The chip 2a, the first antenna 2b and, when present, the support or substrate 2c can be encapsulated in an insulating material 2d, for example, a resin or a ceramic, so as to mechanically protect and electrically insulate the electronic circuit 2. The electromagnetic properties of this insulating material (dielectric and magnetic permittivities) can be adapted to improve the performance of the device.

Regardless of the way with which the transceiver chip 2a and the first antenna 2b are interconnected to form the electronic circuit 2, it is very small in size. Thus, and preferably, this circuit is inscribed within a parallelepiped whose height is typically between 0.5 and 2 mm, the width of between 0.5 and 2 mm and the length of between 4 mm and 15 mm, preferably less than 10 mm.

The radiofrequency transceiver device 1 also comprises a second antenna formed from a textile element 3 made of an electrically conductive material and arranged in non-contiguous turns around and along a textile-core thread 4. The conductive material of the textile element 3 forming the antenna can be made of copper or copper alloy (brass, bronze, cupro-nickel, CuAg, etc.), steel, stainless steel, coppered steel, nickel, made of metallized fibers (silver-plated nylon). The conductive material may be coated with a conductive material of small thickness, typically less than 2 µm for RFID-UHF uses, in order to improve the electrical conduction at the periphery by skin effect or else provide protection against chemical corrosion such as gold or silver. The conductive material of the textile element 3 can be coated with an insulating layer such as an enamel to protect it chemically and mechanically. The textile element 3 may be in the form of a conductive thread with a round, or polygonal, single-stranded or multi-strand cross-section, a strand, or a tape, as will be explained in the various embodiments of the disclosure. It advantageously has a diameter (for a thread) or a thickness (for a tape) of less than 100 microns.

The textile-core thread 4 is made of a non-conductive material and forms a support structure for the other elements of the radiofrequency transceiver device 1 and, in particular, for the second antenna. The textile-core thread 4, along which the second antenna is arranged by winding, has a length substantially equal to a half-wavelength of the transmission frequency between the radiofrequency transceiver device 1 and the remote interrogator. For the usual transmission frequencies, the length of the core thread is therefore on the order of from 5 cm to 20 cm.

Advantageously, the textile-core thread 4 is chosen to have an electrically insulating and extendable nature, that is, in this case the thread has an elastic elongation ability that may be greater than or equal to 5%, 20%, 50%, or even 100% of its length at rest. However, this feature is not essential, and embodiments of the present disclosure are perfectly compatible with a non-extendable textile thread, for example, having an elastic elongation of less than 5%.

By way of example, the textile-core thread 4 may be made from aramid fibers, and thus form a meta-aramid multifilament thread (for example, known under the trade name Nomex™), a thread made of short or long meta-aramid fibers, such as a polyamide-imide (for example, known under the trade name Kermel™). It may alternatively be a PBO thread (poly(p-phenylene-2,6-benzobisoxazole)), known under the trade name Zylon™. It may also be formed from an aromatic polyester (for example, known under the trade name Vectran™). It may also be a thread formed from a polymer such as PEAK (polyaryletherketones), natural fibers, glass fibers, carbon fibers, or PPS fibers (Polyphenylene Sulphide).

The textile-core thread 4 can be formed from a hot-melt material or be adhesive.

The textile-core thread 4 advantageously has a circular cross section and its diameter is between 10 microns and 500 microns.

The second antenna is preferentially of electrical nature, and typically consists of a dipole antenna. "Dipole antenna" means any antenna capable of being coupled to a remote interrogator device by the electric component of the electromagnetic field that propagates between these two elements, and not via an inductive magnetic field alone. This second antenna has a second axis a2 extending generally along the winding direction of the conductive textile element 3 around the textile-core thread 4. This second axis a2 of the antenna corresponds to the winding axis of the textile element. It should be noted that this second antenna is much larger in size than the first antenna.

In the radiofrequency transceiver device 1, the electronic circuit 2, comprising the first antenna, is arranged relative to the second antenna in order to allow their electromagnetic coupling. The non-contiguous character of the turns of the conductive textile element 3 makes it possible to improve the inductance value of this winding, and therefore to promote this coupling. Typically, it involves arranging the electronic circuit 2 (which carries the first antenna) with respect to the textile-core thread 4 (which carries the second antenna) so that the first axis a1 and the second axis a2 are parallel to one another. Preferably, to promote the quality of the coupling, it will be sought to superimpose these two axes or limit the distance separating them.

As a result of this electromagnetic coupling, the second antenna, relatively large in size with respect to the first antenna, is not electrically (galvanically) connected with the transceiver chip 2a as is the case in some solutions of the prior art. The welds or other mechanical connections between a relatively large antenna and the chip are therefore avoided, this antenna being capable of transmitting external forces exerted on the device at these connections.

In addition, the very small size of the electronic circuit 2, combined with the textile nature of the other elements of the transceiver device, ensures the flexible nature of this device, which makes it possible to integrate it into textile parts such as clothing.

These principles can be implemented according to several example embodiments of the present disclosure as set forth in the following description.

First Embodiment

In this first embodiment, which is the subject matter of FIGS. 1A and 1B, the electronic circuit 2 is attached to the textile-core thread, that is, it is directly held on this textile-core thread 4. The conductive textile element 3, preferably a textile thread made of conductive material, is wound around the textile-core thread 4 and the electronic circuit 2. This textile thread may be single-stranded or multistranded. However, in a variant, the conductive textile element 3 can take the form of a tape. This embodiment is advantageous in that it makes it possible to place the electronic circuit 2 inside the volume generated by the windings of the conductive textile element 3 and, consequently, the first axis a1 and the second axis a2 of the antennas are arranged close to one another.

It is thus possible to assemble the electronic circuit 2 to the textile-core thread 4 by way of an adhesive, by arranging, for example, a layer of this adhesive between the electronic circuit 2 and the textile-core thread 4. In some variants, it is not necessary to dispense this adhesive, and the textile-core thread 4 itself may be formed from an adhesive material or may develop adhesive properties via a particular treatment. It is, in particular, the case of a core thread made of hot-melt material, to which the electronic circuit 2 can be adhered after having been heated. Alternatively or in addition to this assembly by adhesion, provision may be made for the electronic circuit 2 to be held assembled to the textile-core thread 4 by a first textile covering thread 5 or by the conductive textile element 3 itself. According to such an approach, the first textile covering thread 5 or the conductive textile element 3 is wound in turns onto the textile-core thread and onto the electronic circuit, to hold it pressed against the textile-core thread 4 and trapped in the turns.

The conductive textile element 3 that forms the second antenna is not necessarily wound around the textile-core thread. This conductive textile element 3 can form one of the elementary textile threads of a textile sheath 6, for example, a sheath woven, braided or knitted from these elementary textile threads. In other words, in this alternative embodiment of the first embodiment, the textile-core thread 4 bearing the electronic circuit 2 is covered with a textile sheath 6 into which the conductive textile element 3 forming the second antenna is integrated. It is also possible, in this embodiment, to integrate a plurality of conductive textile elements into the textile sheath 6, each of these elements being wound in non-contiguous turns around the textile-core thread.

However, in all cases and regardless of the shape taken by the conductive thread element 3, integrated or not in a textile sheath, the latter is arranged in non-contiguous turns around and along the textile-core thread 4.

The manufacturing of a transceiver device according to this first embodiment can be carried out at a high rate, by a method for the collective production of a plurality of radiofrequency transceiver devices 1. This method thus comprises a step S1 of assembling a plurality of electronic circuits 2 on a large-size textile-core thread, so as to space them away from one another along this thread. A spacing at least equal to the antenna length will be chosen, so as to be able to remove a functional radiofrequency transceiver device 1 from the large-size textile-core thread. During this assembly, care is taken to orient the electronic circuit 2 in order to place the first axis a1 of the first antenna substantially parallel to the core thread (which substantially defines the second axis a2 of the second antenna).

As has been seen, the assembly step S1 may involve bonding the electronic circuit onto the large-size textile-core thread. This thread can unwind from a spool by successive sequences, while remaining under tension. During each sequence, the thread is immobilized in front of insertion equipment ("pick and place" according to the term of art) in order to assemble an electronic circuit 2, one surface of which has previously been coated with adhesive. Alternatively, the large-size core thread may be provided periodically with a layer of adhesive using a dispensing nozzle, before placing the electronic circuit 2 therein using the insertion equipment. The large thread provided with the electronic circuits 2 can be recovered from a receiving coil, waiting for the next steps of the method.

Alternatively or in addition to this assembly by adhesive, provision may be made to hold the electronic circuits 2 on the large-size textile-core thread by winding at least a first textile covering thread 5 onto the large-size textile-core thread and onto the electronic circuits, for example, by a wrapping technique. As a reminder, and according to this technique, the large core thread is drawn through a hollow rotating spool carrying the covering thread. The large thread passes through the hollow spool in a vertical direction by pulling it upward or downward. The covering thread unwinds from the hollow spool and winds helically around the core to form turns. It is common to wind a plurality of covering threads around the core, for example, by arranging the two hollow spools one above the other and circulating the core through each of the spools driven in rotation in the same direction or in an opposite direction. By making an electronic circuit via a trough at a wrapping ball, it is possible to place it between the textile-core thread and the covering thread.

It is of course possible to combine both approaches, and provide both the bonding of the electronic circuits 2 on the large-size textile-core thread and its wrapping by at least a first textile covering thread 5.

Resuming the description of the manufacturing method of the transceiver device, the method then comprises a step S2 of preparing the second antenna from the textile element made of an electrically conductive material. This preparation step can implement a wrapping step, that is, winding into turns (not contiguous in this case) of the conductive textile element onto the large-size textile-core thread and onto the electronic circuits 2 (and onto the first textile covering thread 5, if such a first thread has been provided).

According to one approach of the method, particularly advantageous due to its simplicity, the assembly step S1 and the preparation step S2 are carried out simultaneously by winding the conductive textile element directly onto the large-size textile-core thread and onto the electronic circuit 2 in order to assemble it and hold it on the core thread.

The preparation step S2 of the second antenna, whether carried out after or simultaneously with the assembly step S1, does not necessarily implement a wrapping step. Thus, and according to a particular approach, the conductive textile element 3 is integrated into non-contiguous turns in a textile sheath 6 of the textile-core thread 4.

The integration of the conductive textile element can be carried out by weaving, by knitting or by braiding the textile sheath 6 around the large-size textile-core thread carrying the electronic circuits 2 from elementary textile threads, the conductive textile element forming at least one of these elementary threads.

At the end of the assembly and preparation steps S1 and S2, there is therefore a long textile thread or tape, which can be collected in a storage spool, this textile thread or tape being composed of a plurality of radiofrequency transceiver devices 1 connected together. These radiofrequency transceiver devices 1 can be individualized by removing successive sections of the textile thread or tape. Advantageously, the cutting points of the long length textile or textile tape are chosen to position the electronic circuits 2 substantially halfway between the textile-core thread 4 of the individualized radiofrequency transceiver devices 1.

Second Embodiment

In this second embodiment, an example of which is shown in FIG. 2, the electronic circuit 2 is attached to the conductive textile element 3, that is, the conductive textile element 3 is wound in turns directly onto the textile-core thread 4, while the electronic circuit 2 is, for its part, assembled to an exterior surface of at least one turn. The electronic circuit 2 is therefore arranged outside the volume generated by the windings of the conductive textile element 3.

The electronic circuit 2 can be assembled by bonding to at least one turn of the conductive textile element 3, or held by any other means. The electronic circuit may extend over several turns of the conductive textile element 3 in order to promote the coupling between the first and the second antenna.

The conductive textile element 3 of this embodiment can take the form of a tape or thread. "Tape" means an elongated, flexible and flat film. This tape may, for example, consist of a rolled metal wire. This tape is wound against the textile-core thread 4, lightly pressed against this textile-core thread 4. It is not necessary to provide adhesive material between the textile-core thread 4 and the tape.

The tape is formed of an electrically conductive material, which may be a metal or a plurality of metals (for example, copper, brass, bronze, cupro-nickel, a copper alloy comprising more than 96% by mass of copper, nickel). It may be a rolled metal wire. In this case, and advantageously, this rolling is carried out cold. Preferably, it is not followed by thermal annealing. This method increases the hardening of the material constituting the tape, and therefore its fatigue resistance.

Provision may be made for this tape to consist of a main layer of a first material, this main layer being covered on at least one of its faces with an electrically conductive or insulating coating. Thus, the main layer may be made of steel coated with a coating made of a material chosen from the group consisting of the following materials: silver, gold, copper, tin, nickel, brass, bronze, zinc and tin alloys.

Alternatively, the main layer may be made of a material chosen from the group consisting of the following materials: stainless steel, a nickel alloy in which nickel alone represents at least 45% of the mass of the alloy, a titanium alloy in which titanium alone represents at least 70% of the mass of the alloy, nickel.

Advantageously, the coating has an electrical resistivity lower than that of the material forming the main layer. It may be chosen for its anti-corrosion properties, for example, being made of silver. The coating can be formed by deposition on the main layer, before or after a rolling step, as presented in a previous paragraph. The coating may also be an electrical insulator, for example, an enamel, in order to mechanically and/or chemically protect the tape.

Whatever the chosen nature of the tape, it has a small thickness, less than 50 microns, and typically between 5 microns and 20 microns, and advantageously between 5 microns and 10 microns, so as to be flexible enough to be wound in turns onto the textile-core thread 4. It is capable of deforming elastically or plastically. Typically, the tape has a thickness 10 to 20 times, or even 30 times, less than the diameter of the textile-core thread 4. The tape may have a width of between 40 microns and 200 microns, although this feature is not limiting in any way.

The manufacture of a radiofrequency transceiver device 1 according to this second embodiment is relatively simple and is based on the same collective manufacturing steps S1, S2 as those described for the manufacture of a radiofrequency transceiver device 1 according to the first embodiment.

Thus, such a method first comprises the preparation step S2 of the second antenna from the textile element 3 made of electrically conductive material. This preparation step S2 can implement a step of wrapping the textile element onto the large core thread or the production of a textile sheath directly on this core thread, the production of this sheath (by braiding, knitting, or weaving, for example) incorporating the conductive textile element winding into non-contiguous turns around the large core thread.

The manufacturing method then comprises a step S1 of assembling a plurality of electronic circuits 2 on an exterior surface of at least one turn of the conductive textile element 3, so as to space them away from one another along the thread. A spacing at least equal to antenna length is chosen, so as to be able to remove a radiofrequency transceiver device 1. During this assembly, just as in the first embodiment, care is taken to orient the electronic circuit to place the first axis a1 of the first antenna substantially parallel to the core thread (which defines the second axis a2 of the second antenna).

This assembly can be carried out by bonding, by wrapping at least one covering thread, just as in the first embodiment.

At the end of these steps, a long textile thread is therefore available, which can be collected in a storage spool, this textile thread being formed from a plurality of radiofrequency transceiver devices 1 connected together. These devices can be individualized by removing successive sections of the textile thread, as has been explained in relation to the description of the method for manufacturing a transceiver device according to the first embodiment.

Naturally, the disclosure is not limited to the embodiments described, and it is possible to add alternative embodiments without departing from the scope of the invention as defined by the claims.

Thus, provision may be made to protect the transceiver device by providing it with a coating layer, encapsulating the electronic circuit, the textile-core thread and the textile element. It may, in particular, be polyurethane or silicone. The coating layer can be formed by extrusion on the transceiver device.

Furthermore, a transceiver device, the subject matter of the present description, can be incorporated directly into a product, for example, a textile product such as clothing. However, this device can find fields of application other than textiles, and it could be advantageous for the electronic tagging of any type of product, in particular, those having a certain flexibility.

The device can be integrated directly, for example, by weaving, embroidering or sewing it into a textile piece. However, it can be previously integrated into a tag to facilitate its integration, as described in document FR2002785.

The device can also be integrated into a tag taking shapes other than that provided in this document, for example, in a piping, a woven bias or a rat tail or any other type of textile parts to be sewn.

It will be recalled that these types of textile parts to be sewn are generally formed by a tape folded into a tube on a bundle of textile threads or a cord forming a filler. In the case of the present disclosure, the tape can be folded onto the transceiver device, for example, when it is in the form of a large-size textile thread before it is individualized, this large-size textile thread contributing to the filling of the tube.

The invention claimed is:

1. A radiofrequency transceiver device, comprising:
   an electronic circuit comprising a chip and a first antenna electrically connected to the chip;
   a textile-core thread comprising a non-conductive material; and
   a second antenna comprising a textile element including an electrically conductive material, the second antenna arranged in non-contiguous turns around and along the textile-core thread;
   wherein the electronic circuit is disposed relative to the second antenna to allow electromagnetic coupling of the first antenna and the second antenna.

2. The radiofrequency transceiver device of claim 1, wherein the first antenna has a first axis, the second antenna has a second axis, the first axis and the second axis being parallel to one another.

3. The radiofrequency transceiver device of claim 1, wherein the electronic circuit is attached and held to the textile-core thread by adhesion and/or by a first textile covering thread, or by the conductive textile element wound in turns onto the textile-core thread and onto the electronic circuit.

4. The radiofrequency transceiver device of claim 3, wherein the conductive textile element is integrated into a textile sheath, and the electronic circuit and the textile-core thread are arranged inside the textile sheath.

5. The radiofrequency transceiver device of claim 1, wherein the conductive textile element is wound directly onto the textile-core thread, and the electronic circuit is assembled onto an exterior surface of at least one turn.

6. The radiofrequency transceiver device of claim 5, wherein the conductive textile element is a tape or thread.

7. The radiofrequency transceiver device of claim 1, further comprising a second covering thread wound in turns around the textile-core thread, the electronic circuit and the conductive textile element.

8. An electronic tag comprising the radiofrequency transceiver device according to claim 1.

9. A method for manufacturing a radiofrequency transceiver device, the method comprising:
   assembling a plurality of electronic circuits on a textile-core thread, so as to space them away from one another along the textile-core thread, the electronic circuits each comprising a chip and a first antenna electrically connected to the chip; and forming a second antenna comprising a textile element including an electrically conductive material and arranged in non-contiguous turns around the textile-core thread.

10. The method of claim 9, wherein the assembling comprises applying an adhesive to hold the plurality of electronic circuits directly onto the textile-core thread.

11. The method of claim 9, wherein the assembling comprises winding into turns a first textile covering thread onto the textile-core thread and onto the electronic circuits.

12. The method of claim 9, wherein the assembling and the forming are carried out simultaneously by winding the conductive textile element directly onto the textile-core thread and onto the electronic circuit.

13. The method of claim 9, wherein the forming comprises integration of the conductive textile element into non-contiguous turns in a textile sheath of the textile-core thread.

14. The method of claim 9, wherein the forming comprises winding the conductive textile element directly onto the textile-core thread, and the assembly-assembling is carried out after the forming, and the assembling comprises assembling each electronic circuit onto an exterior surface of at least one turn of the conductive textile element.

15. The method of claim 9, wherein the conductive textile element is a tape or thread.

16. The method of claim 9, further comprising winding in turns a second covering thread around the textile-core thread and the conductive textile element.

17. The radiofrequency transceiver device of claim 2, wherein the electronic circuit is attached and held to the textile-core thread by adhesion and/or by a first textile covering thread, or by the conductive textile element wound in turns onto the textile-core thread and onto the electronic circuit.

18. The radiofrequency transceiver device of claim 17, wherein the conductive textile element is integrated into a textile sheath, and the electronic circuit and the textile-core thread are arranged inside the textile sheath.

19. The radiofrequency transceiver device of claim 2, wherein the conductive textile element is wound directly onto the textile-core thread, and the electronic circuit is assembled onto an exterior surface of at least one turn.

20. The radiofrequency transceiver device of claim 19, wherein the conductive textile element is a tape or thread.

* * * * *